(12) United States Patent
Kato

(10) Patent No.: US 8,532,104 B2
(45) Date of Patent: Sep. 10, 2013

(54) COMMUNICATION APPARATUS CAPABLE OF TRAFFIC CONTROLLING IN SERIAL CONNECTED QUEUES

(75) Inventor: Hiroaki Kato, Kikugawa (JP)

(73) Assignee: Yamaha Corporation, Hamamatsu-shi (JP)

( * ) Notice: Subject to any disclaimer, the term of this patent is extended or adjusted under 35 U.S.C. 154(b) by 368 days.

(21) Appl. No.: 11/504,414

(22) Filed: Aug. 15, 2006

(65) Prior Publication Data
US 2007/0047564 A1 Mar. 1, 2007

(30) Foreign Application Priority Data
Aug. 31, 2005 (JP) ................................. 2005-252431

(51) Int. Cl.
H04L 12/56 (2011.01)
(52) U.S. Cl.
USPC .......................................... 370/392; 370/429
(58) Field of Classification Search
None
See application file for complete search history.

(56) References Cited

U.S. PATENT DOCUMENTS

| | | | | |
|---|---|---|---|---|
| 7,158,527 B2 * | 1/2007 | Malomsoky et al. | ......... | 370/414 |
| 7,430,187 B2 * | 9/2008 | Holt et al. | .......... | 370/329 |
| 2002/0095498 A1 * | 7/2002 | Chanda et al. | ................. | 709/225 |
| 2005/0243853 A1 * | 11/2005 | Bitar et al. | .................... | 370/432 |
| 2005/0268324 A1 * | 12/2005 | An | ............................... | 725/152 |
| 2006/0039395 A1 * | 2/2006 | Perez-Costa et al. | ......... | 370/412 |

FOREIGN PATENT DOCUMENTS

| | | |
|---|---|---|
| JP | 2000-270023 | 9/2000 |
| JP | 2001-016206 | 1/2001 |
| JP | 2001-197110 | 7/2001 |
| JP | 2002-217961 | 8/2002 |
| JP | 2004-266389 | 9/2004 |
| JP | 2005-033673 | 2/2005 |

OTHER PUBLICATIONS

Japanese Patent Office ("Notification of Reasons for Refusal"), Application No. 2005-252431, dated Aug. 8, 2007.

* cited by examiner

*Primary Examiner* — Faruk Hamza
*Assistant Examiner* — Tito Pham
(74) *Attorney, Agent, or Firm* — Pillsbury Winthrop Shaw Pittman LLP

(57) ABSTRACT

A communication apparatus includes a plurality of first queues to which priorities or predetermined bandwidths are assigned respectively, a plurality of second queues which are corresponded to any of the plurality of first queues and to which the priorities are assigned respectively, a first writing portion which writes data blocks into any of the plurality of second queues or any of the plurality of first queues which is not corresponded to the second queues in accordance with a rule, a second writing portion which reads the data blocks stored in the plurality of second queues in order of the priorities assigned to the second queues respectively, and writes the data blocks into at least one of the first queues which is corresponded to the second queues, and a transmitting portion which reads the data blocks stored in the plurality of first queues in order of the priorities assigned to the first queues respectively or at time intervals corresponding to the bandwidths assigned to the first queues respectively, and transfers the data blocks to the communication network.

3 Claims, 3 Drawing Sheets

| QUEUE IDENTIFIER | BANDWIDTH (%) | FOLLOWER QUEUE | CLASSIFICATION RULE | |
|---|---|---|---|---|
| | | | SENDER ADDRESS | SENDER PORT NUMBER |
| Q1 | 50 | NULL | ADDRESS RANGE 1 | NULL |
| Q2 | 30 | NULL | ADDRESS RANGE 2 | NULL |
| Q3 | 20 | Q3/1 | ADDRESS RANGE 3 | P01 |
| | | Q3/2 | | P02 |
| | | Q3/3 | | P03 |

# COMMUNICATION APPARATUS CAPABLE OF TRAFFIC CONTROLLING IN SERIAL CONNECTED QUEUES

BACKGROUND OF THE INVENTION

The present invention relates to the technology to establish data communication via a communication network and, more particularly, the technology to control bandwidths assigned to the data communication.

Recently, the streaming is utilized popularly through the spread of high-speed data communication technology such as ADSL, or the like. This streaming distributes motion picture data or music data via the communication network, and the user reproduces a motion picture from the motion picture data and a music piece from the music data in real time.

In the streaming of this type, it is important that the motion picture data or the music data as the transmission object should be delivered without fail to the destination at a predetermined transmission speed, in other words, qualities of service (also referred to as "QoS" hereinafter) such as a transmission speed, a transmission delay, and the like should be maintained constant. Therefore, the technology to ensure QoS has been proposed variously in the prior art. By way of example, two types of technologies, i.e., the "traffic shaping system" and the "priority queueing system" can be given.

The traffic shaping system provides such a control system that a series of data transmitted via the communication network (also referred to as the "traffic" hereinafter) are classified in accordance with predetermined rules and then a predetermined bandwidth is assigned to every classified traffic. In contrast, the priority queueing system provides such a control system that the priority is assigned to the classified traffics respectively and then the traffic is sent out sequentially to the communication network in order of higher priority.

Also, in the technology disclosed in JP-A-2000-270023, a band used in the priority queueing system is secured separately from a band used in the traffic shaping system and then traffic transmission control (referred simply to as the "traffic control" hereinafter) is executed by combining the traffic shaping system and the priority queueing system with each other in parallel.

However, according to the technology disclosed in JP-A-2000-270023, the band used in the priority queueing system must be kept previously and thus such band cannot be used in the traffic shaping system. Therefore, such band cannot be used at all when the traffic as the control object in the priority queueing system is not present.

Also, according to the technology disclosed in JP-A-2000-270023, it is possible to apply the traffic shaping system and the priority queueing system in combination, nevertheless a way of combining both systems is limited to the parallel combination as mentioned above.

SUMMARY OF THE INVENTION

The present invention has been made in view of the above problem, and aims at providing the technology to improve a degree of freedom in using a plurality of traffic control systems in combination, and to realize a flexible traffic control.

In order to solve the above problem, the present invention provides a communication apparatus, comprising:

a plurality of first queues to which priorities or predetermined bandwidths are assigned respectively;

a plurality of second queues which are corresponded to any of the plurality of first queues and to which priorities are assigned respectively;

a first writing portion which writes data blocks into any of the plurality of second queues or any of the plurality of first queues which is not corresponded to the second queues in accordance with a rule;

a second writing portion which reads the data blocks stored in the plurality of second queues in order of the priorities assigned to the second queues respectively, and writes the data blocks into at least one of the first queues which is corresponded to the second queues; and a transmitting portion which reads the data blocks stored in the plurality of first queues in order of the priorities assigned to the first queues respectively or at time intervals corresponding to the bandwidths assigned to the first queues respectively, and transmits the data blocks to the communication network.

Preferably, the communication apparatus further includes a setting portion which sets the rule. Each of the data blocks includes a header portion which has a communication address indicating a destination or a sender and either an application identifier indicating an application program for receiving the data blocks or an application program for transmitting the data blocks or a priority identifier indicating priorities of the data blocks. The rule defines that the data blocks are respectively corresponded to the plurality of second queues and the plurality of first queues on the basis of one or more of the communication addresses, the application identifier and the priority identifier contained in the header portions of the data blocks. In this configuration, when the data blocks to be transmitted to the opposing system are classified and written into the queues which are hierarchies into two layers as described above, in accordance with each index of the communication address or the application identifier or the priority identifier contained in the header portion, a degree of freedom in combining these indices can be improved and also a degree of freedom in setting the rule can be improved.

In order to solve the above problem, another embodiment of the present invention provides a program that causes a computer unit to function as a communication apparatus, which includes a plurality of first queues to which priorities or predetermined bandwidths are assigned respectively, a plurality of second queues which are corresponded to any of the plurality of first queues and to which priorities are assigned respectively, a first writing portion which writes data blocks, which is to be transmitted to an opposing system via a communication network, into any of the plurality of second queues or any of the plurality of first queues which is not corresponded to the second queues, in accordance with a rule, a second writing portion which reads the data blocks stored in the plurality of second queues in order of the priorities assigned to the second queues respectively, and writes the data blocks into at least one of the first queues which is corresponded to the second queues, and a transmitting portion which reads the data blocks stored in the plurality of first queues in order of priorities assigned to the first queues respectively or at time intervals corresponding to the bandwidths assigned to the first queues respectively, and transmits the data blocks to the communication network.

According to the present invention, such advantages can be achieved that a degree of freedom in using a plurality of traffic control systems in combination can be improved and also a flexible traffic control can be realized.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A best mode for carrying out the present invention will be explained with reference to the drawings hereinafter.

(A. Configuration)

Figure 1:
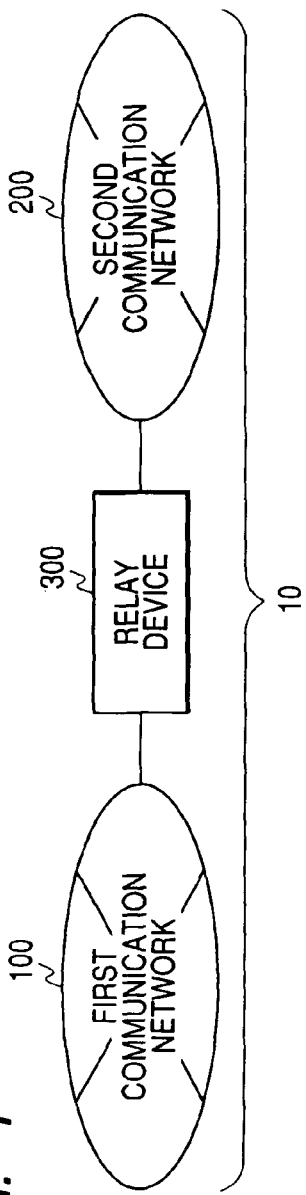
FIG. 1 is a block diagram showing an example of an overall configuration of a communication system including a relay device as a first embodiment according to the present invention.

FIG. 1 is a block diagram showing a configurative example of a communication system 10 including a relay device 300 as a first embodiment according to the present invention. As shown in FIG. 1, a first communication network 100 as a LAN (Local Area Network), for example, and a second communication network 200 as the public network (communication network used by an unspecified large number of users in common) such as the Internet, for example, are contained in the communication system 10. Both communication networks are connected via the relay device 300.

The relay device 300 is a router, for example, and intercedes in data communication between a communication device (not shown) connected to the first communication network 100 and a communication device (not shown) connected to the second communication network 200 in compliance with a predetermined communication protocol (in the present embodiment, "IP"). For example, when the relay device 300 receives a data block (i.e., a packet) transmitted from the first communication network 100 in compliance with the predetermined communication protocol, such equipment checks a header portion of the packet to decide whether or not a destination of the packet corresponds to a communication device connected to the second communication network 200, and then transfers the packet to the destination in compliance with the predetermined communication protocol if the result of decision is affirmative. Also, the relay device 300 is constructed to execute the traffic control constituting a characteristic feature of the communication device according to the present invention while such equipment executes the above packet transferring process.

In the present embodiment, the case where the relay device 300 is a router will be explained. But it is a matter of course that a gateway (i.e., a communication device that executes a relay processing while executing a mutual transformation between the communication protocol in the first communication network 100 and the communication protocol in the second communication network 200) may be employed.

Figure 2:
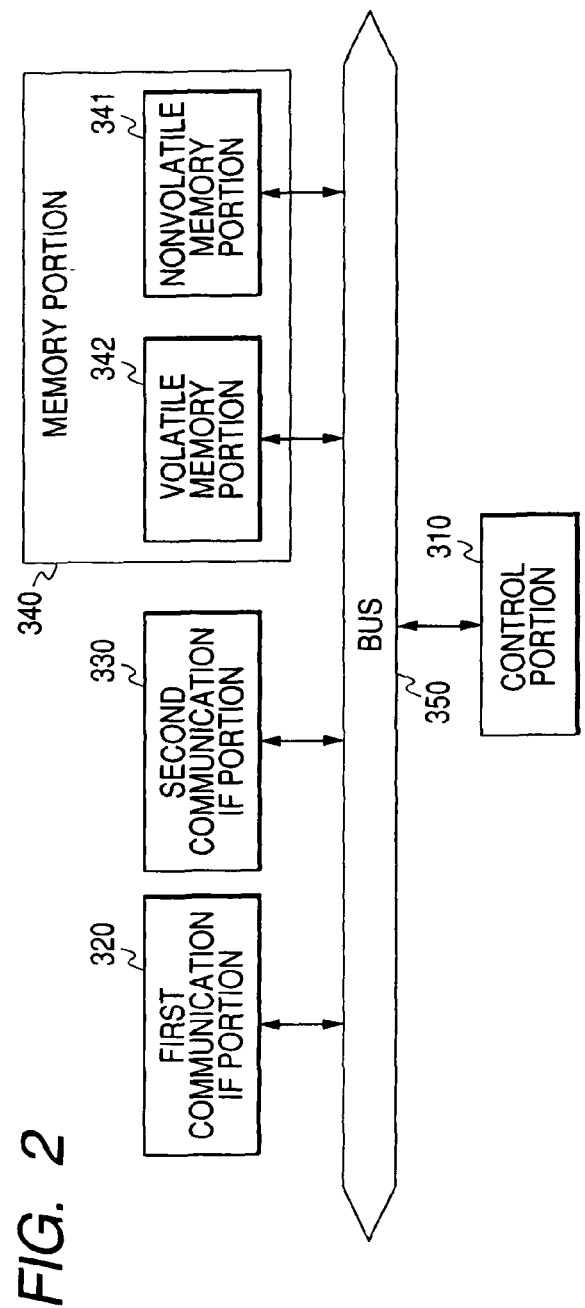
FIG. 2 is a block diagram showing a configurative example of the relay device of the communication system.

FIG. 2 is a block diagram showing an example of a hardware configuration of the relay device 300. As shown in FIG. 2, the relay device 300 includes a control portion 310, a first communication interface (referred to as "IF" hereinafter) portion 320, a second communication IF portion 330, a memory portion 340, and a bus 350 for mediating in data transfer between these constituent elements.

The control portion 310 is CPU (Central Processing Unit), for example, and controls the operations of other constituent elements by executing the program stored in the memory portion 340, described later.

Both the first communication IF portion 320 and the second communication IF portion 330 are NIC (Network Interface Card), and are connected to a different communication network respectively. More particularly, the first communication IF portion 320 is connected to the first communication network 100, and the second communication IF portion 330 is connected to the second communication network 200.

The first communication IF portion 320 and the second communication IF portion 330 receive the packet transmitted via the communication networks to which the IF portion is connected respectively, and then transfer the packet to the control portion 310, while send out the packet transferred from the control portion 310 to the communication networks to which the IF portion is connected respectively. In the present embodiment, in order to simplify the explanation, merely the case where the packet transmitted from the first communication network 100 is transferred to the second communication network 200 will be explained hereunder.

As shown in FIG. 2, the memory portion 340 has a nonvolatile memory portion 341 and a volatile memory portion 342.

The nonvolatile memory portion 341 is composed of ROM or a hard disk, for example. The program for causing the control portion 310 to execute the process that sends out the packet while executing the traffic control constituting a characteristic feature of the communication system according to the present invention is stored in advance in the nonvolatile memory portion 341. Also, an administration table shown in FIG. 3 is stored in advance in the nonvolatile memory portion 341.

Figures 3, 4:
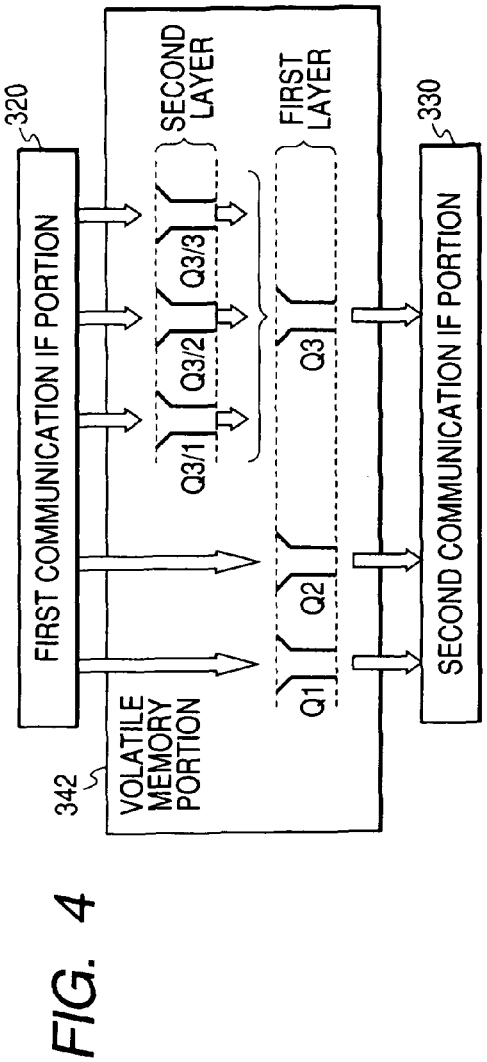
FIG. 3 is a view showing an example of an administration table stored in a nonvolatile memory portion in the relay device.
FIG. 4 is a view showing an example of a queue formed in a volatile memory portion of the relay device.

As show in FIG. 3, bandwidth data representing a bandwidth assigned to the queue, subqueue identifiers belonging to the followers of the queue (or "NULL" when the queue does not have the subqueue), and rule data representing a rule used to classify the packets loaded on the queue are stored in the administration table to correlate with respective queue identifiers. These queue identifiers represent the queues when the traffic control is executed by the above traffic shaping system. For example, the administration table shown in FIG. 3 represents four items described as follows.

First, three queues (to which the queue identifiers Q1, Q2, and Q3 are assigned respectively) used to execute the traffic control in the traffic shaping system are employed in the present embodiment. In the present embodiment, the case where the traffic control is executed by the traffic shaping system while using three queues will be explained. But the number of queues used in the traffic control in the traffic shaping system is not limited to three, and any number may be employed if the number is in excess of 2.

Second, 50%, 30%, and 20% of the bandwidth that can be utilized for the second communication network 200 as the destination of the packet are assigned to the queues having the queue identifiers Q1, Q2, and Q3 respectively. For example, when the bandwidth that can be utilized for the second communication network 200 is 20 Mbps, 10 Mbps, 6 Mbps, and 4 Mbps of the bandwidth are assigned to the queues having the queue identifiers Q1, Q2, and Q3 respectively. In the present embodiment, the case where the bandwidth is assigned to respective queues used in the traffic control in the traffic shaping system based on respective ratios to a total bandwidth that can be utilized for the communication network as the destination of the packet will be explained. But values of the bandwidths assigned to respective queues (for example, 10 Mbps, and the like) may be of course correlated directly with the queues previously.

Third, only the queue having the queue identifier Q3 out of three queues has three follower subqueues, and the queue identifiers of these subqueues are Q3/1, Q3/2, and Q3/3. Here, the queue identifier "Qm/n" assigned to the subqueue indicates that this queue identifier is the n-th subqueue of the queue having the queue identifier "Qm". In the following, the queue used to transfer the stored packet to the second communication IF portion 330 (in the present embodiment, three queues having the queue identifiers Q1, Q2, and Q3) is called the "first layer queue", and also the queue used to transfer the packet to the first layer queue (in the present embodiment, three queues having the queue identifiers Q3/1, Q3/2, and Q3/3) is called the "second layer queue". The larger the number (i.e., "n") in the second layer is, the higher the priority assigned previously to the second layer queue becomes. Then, the packet stored in the subqueue is transferred to the first layer queue corresponding to the subqueue in order of higher priority that is assigned to the subqueue. In the present embodiment, the case where three subqueues are provided as the followers of the queue whose queue identifier is Q3 will be explained. But it is a matter of course that the number of the concerning subqueues is not limited to three. Also, in the present embodiment, the case where one of three queues in the first layer has the subqueue as the follower will be explained. But it is of course that a plurality of queues belonging to the first layer may have the subqueue as the follower. Also, in the present embodiment, the case where, if the larger number is assigned to the queue belonging to the second layer, the higher priority is assigned previously to such queue in the second layer will be explained. Conversely, of course the higher priority may be assigned to the queue having the smaller number.

Fourth, data representing a range of a sender address and an application identifier (in the present embodiment, the sender port number) indicating the type of application program used to transmit the packet are employed as the rule data. The packets are classified in accordance with this rule, with the result that, for example, the packet whose sender address belongs to an address range 1 is loaded to the queue with the queue identifier Q1, the packet whose sender address belongs to an address range 2 is loaded to the queue with the queue identifier Q2, and the packet whose sender address belongs to an address range 3 is loaded to the queue with the queue identifier Q3. In this case, since the queue having the queue identifier Q3 has the subqueues as the follower, the packet with the sender address belonging to the address range 3 is never directly loaded to the queue. This queue is classified appropriately into three subqueues in answer to the value of the identifier written in the header portion of the packet, and then the packet is written into three subqueues respectively (for example, the packet whose sender address belongs to an address range 3 and whose sender port number written into the header portion is "P01" is written into the queue whose queue identifier is Q3/1). In the present embodiment, the case where one sender port number is correlated with each queue in the second layer will be explained. But it is a matter of course that a plurality of sender port numbers may be assigned to each queue in the second layer not to overlap with each other.

Also, in the present embodiment, the case where the administration table having the stored contents shown in FIG. 3 is stored in advance in the nonvolatile memory portion 341 will be explained. But such stored contents in the administration table can be of course updated by causing a display portion such as a liquid crystal display (not shown in FIG. 2) to display the stored contents and then operating appropriately an operating portion such as a keyboard, a mouse, or the like (also not shown in FIG. 2). Such configuration makes it possible for the operation administrator of the relay device 300 to set arbitrarily the number of the first layer queues and the number of the second layer queues, correspondences between the first layer queues and the second layer queues, and rules applied when the received packets are classified into respective queues and loaded on them.

The volatile memory portion 342 in FIG. 2 is RAM (Random Access Memory), and is utilized as a work area by the control portion 310 operated in compliance with the program. Also, as shown in FIG. 4, the first layer queues Q1, Q2, and Q3 and the second layer queues Q3/1, Q3/2, and Q3/3 are assigned in the inside of the volatile memory portion 342, in accordance with the hierarchical structure representing the stored contents (see FIG. 3) in the above administration table.

With the above, a configuration of the relay device 300 is explained.

(B. Operation)

Then, an operation that the control portion 310 executes in compliance with a program stored in the nonvolatile memory portion 341 will be explained hereunder. Here, in an operational example explained in the following, suppose that six queues having the hierarchical structure shown in FIG. 4 respectively are assigned to the volatile memory portion 342.

Figure 5:
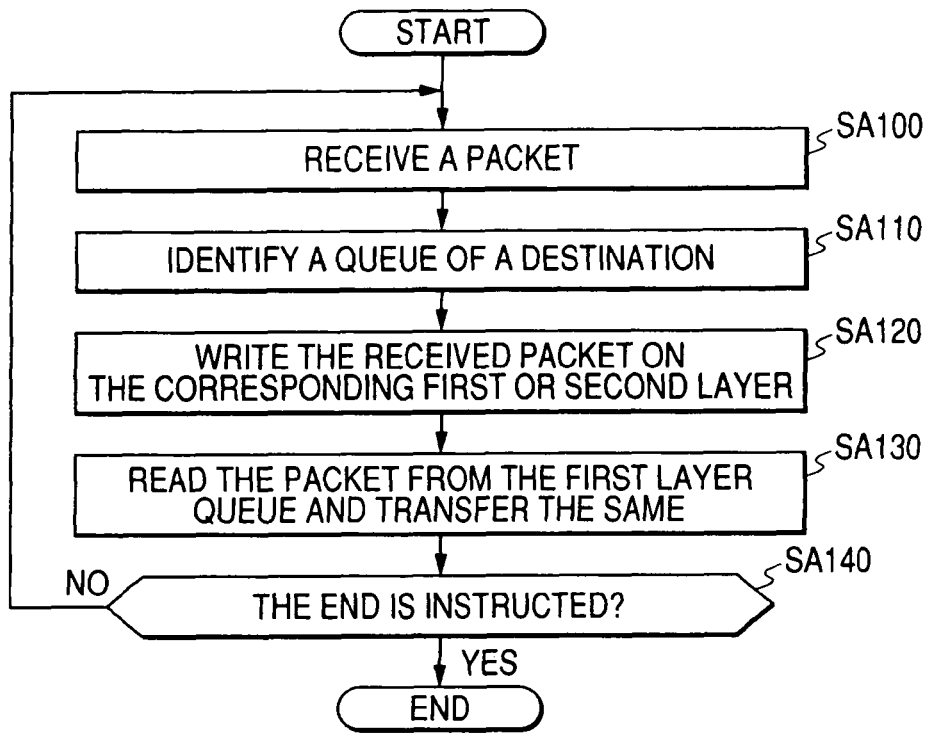
FIG. 5 is a flowchart showing a flow of the packet transmitting process executed by a control portion of the relay device.

FIG. 5 is a flowchart showing a flow of the packet transferring process that the control portion 310 executes in compliance with the program. As shown in FIG. 5, when the control portion 310 receives the packet via the first communication IF portion 320 (step SA100), it identifies the queue, into which the packet is stored, with reference to the stored contents in the foregoing administration table (step SA110).

For example, if the sender address of the packet received in step SA100 belongs to the address range 1, the control portion 310 identifies "the queue having the queue identifier Q1" as the stored destination of the packet. Also, if the sender address of the packet received in step SA100 belongs to the address range 3, the control portion 310 further refers to the application identifier (in the present embodiment, the sender port number) written in the header of the packet, and identifies to which one of three subqueues (queue having one of the queue identifiers Q3/1, Q3/2, and Q3/3) the packet should be loaded.

Then, the control portion 310 writes the packet received in step SA100 in the queue identified in step SA110 (step SA120). Then, the control portion 310 reads the packet stored in the first layer queue at a time interval (concretely a value obtained by dividing a data size of the packet by the bandwidth) in response to the bandwidth assigned to the queue, and transfers the packet to the second communication IF portion 330 to send out it to the second communication network 200 (step SA130).

Subsequently, the control portion 310 decides whether or not the end of the packet transferring process is instructed via the operating portion (not shown), or the like (step SA140). Then, the control portion 310 executes repeatedly the processes in step SA100 to step SA130 until the decision result becomes "Yes".

Figure 6:
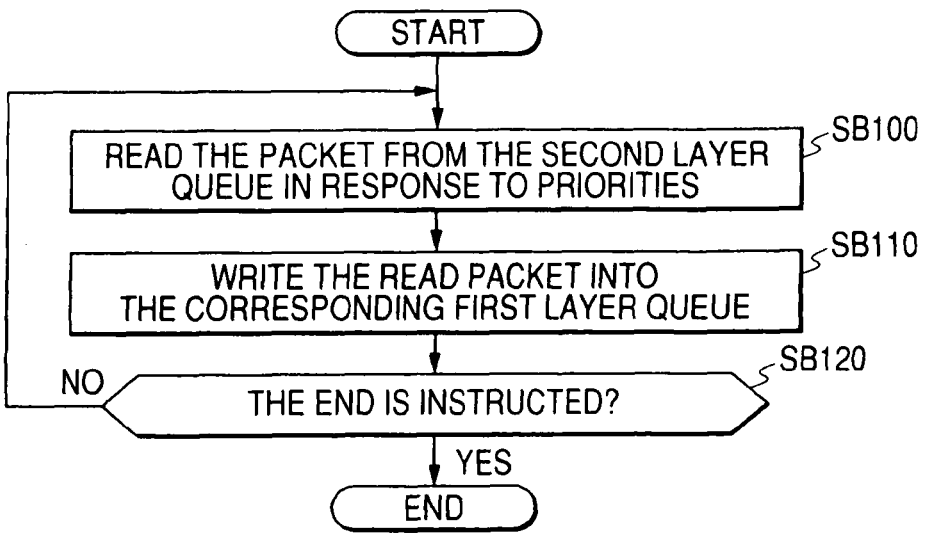
FIG. 6 is a flowchart showing a flow of the process executed when the control portion 310 writes a packet stored in a second layer queue on a first layer queue.

Meanwhile, the packet written into the second layer queue in step SA120 (the packet whose sender address belongs to the address range 3) is written into the first layer queue corresponding to this second layer queue when the control portion 310 executes the process given in a flowchart shown in FIG. 6. To explain in more detail, as shown in FIG. 6, the control portion 310 first reads the packet from the second layer queue (in the present embodiment, the queue whose queue identifier is Q3/1, Q3/2, or Q3/3) in response to the priority (step SB100). Then, the control portion 310 writes the read packet into the corresponding first layer queue (in the present embodiment, the queue whose queue identifier is Q3)(step SB110).

As described above, in the present embodiment, the highest priority is assigned to the queue having the queue identifier Q3/3 out of three queues belonging to the second layer. Therefore, the queue is always read from this packet in step SB100 while the packet is stored in this queue, and thus the packet is never read from other queues belonging to the second layer. Also, when the packet is not stored in the queue to which the priority higher than that queue is assigned (i.e., the queue whose queue identifier is Q3/3), the packet is read from the queue whose queue identifier is Q3/2. Also, when the packet is not stored in both the queue whose queue identifier is Q3/3 and the queue whose queue identifier is Q3/2, the packet is read the queue whose queue identifier is Q3/1.

Also, after the execution of step SB110, the control portion 310 decides whether or not the end of the packet transferring process is instructed via the operating portion (not shown), or the like (step SB120). Then, the control portion 310 executes repeatedly the processes in step SB100 to step SB110 until the decision result becomes "Yes".

As a result of the operation explained above, the packet being transmitted from the communication device, to which the communication address belonging to the address range 1 is assigned, via the first communication network 100 and also the packet being transmitted from the communication device, to which the communication address belonging to the address range 2 is assigned, via the first communication network 100 are always sent out to the second communication network 200 in a predetermined bandwidth (10 Mbps in the former, and 6 Mbps in the latter). In contrast, the packet being transmitted from the communication device, to which the communication address belonging to the address range 3 is assigned, via the first communication network 100 is sent out to the second communication network 200 within a range of a predetermined bandwidth (in the present embodiment, 4 Mbps) in order of priority response to the type of the application program (i.e., the value of the sender port number written in the header portion of the packet) utilized to transmit the packet.

In this manner, according to the present embodiment, the series combination of the traffic shaping system and the priority queueing system can be achieved. As a result, a degree of freedom of the way of combining the traffic shaping system and the priority queueing system can be improved rather than the technology disclosed in JP-A-2000-270023, and also the fine-grained traffic control (as described above, the traffic control executed based on the sender address and the sender port number) can be applied.

(C. Variation)

With the above, one embodiment of the present invention is explained. But it is needless to say that the above embodiment can be varied as explained in the following.

(1) In the above embodiment, the case where the traffic control is executed based on the priority queueing system in the second layer queue and the traffic control is executed based on the traffic shaping system in the first layer queue is explained. However, it is of course that the traffic control may be executed based on the priority queueing system in both the first layer queue and the second layer queue. Also, both the queue used in the traffic shaping system and the queue used in the priority queueing system may be contained in the queue belonging to the first layer.

(2) In the above embodiment, the case where the traffic control in the traffic shaping system is executed according to the value of the sender address of the packet whereas the traffic control in the priority queueing system is executed according to the value of the sender port number is explained. In this case, the traffic control in the traffic shaping system may be executed according to the value of the sender port number whereas the traffic control in the priority queueing system may be executed according to the value of the sender address. Also, the destination address may be used in place of the sender address, and the destination port number may be used in place of the sender port number.

Also, in the above embodiment, the case where the priority queueing is executed in answer to the sender port number written in the header portion of the packet is explained. In this case, for example, of course the packet including the data written in a predetermined area such as a TOS field, or the like of the header portion to represent the priority (e.g., in the above embodiment, the queue number of the second layer queue, or the like; referred to as the "precedence value" hereinafter) may be transmitted in transmitting the packet, and then the traffic control in either the priority queueing system or the traffic shaping system may be executed by referring to this precedence value. Also, the traffic control in either the priority queueing system or the traffic shaping system may be executed in response to a DSCP value written in a DS field of the packet.

Further, in case the traffic control in the priority queueing system is executed in both the first layer and the second layer, for example, the traffic control in the priority queueing system may be executed based on the sender or destination address in the first layer, and the traffic control in the priority queueing system may be executed based on the precedence value or the application identifier in the second layer. According to such control, even in the packet into which the same precedence value or the same application identifier is written, the traffic control is executed in order of different priority when the sender or the destination is different.

Moreover, in the above embodiment, the case where the packets are classified based on the indices that are different mutually in the first layer and the second layer (the sender address and the sender port number) is explained. In this case, the packets may be classified based on the same index. Concretely, for example, the rule data representing the sender port number correlated with respective queues in the second layer in the administration table shown in FIG. 3 may be replaced with the rule data representing the address ranges that are defined by subdividing further the address range 3.

(3) In the above embodiment, the case where the present invention is applied to the relay device that mediates in communication between two communication networks is explained. In this case, it is of course that the present invention may be applied to the transmitting equipment that is positioned at the end of the communication line. In short, any communication equipment may be employed if such communication equipment can send out the data to the communication network while executing the traffic control.

(4) In the above embodiment, the case where the traffic control is executed by queuing the packet as the data block in the network layer is explained. In this case, the traffic control may be executed by queuing the frame as the data block in the lower layer (e.g., the data link layer) lower than the network layer. Conversely, the traffic control may be executed by queuing the segment as the data block in the upper layer (e.g., the transport layer) higher than the network layer. In short, if such a mode can be applied to the protocol hierarchy that the traffic control is executed by queuing the data block that is transmitted/received in compliance with a predetermined communication protocol, any layer of the protocol hierarchy to which the communication protocol belongs can be adopted.

(5) In the above embodiment, the case where the function as the characteristic feature of the communication system according to the present invention is accomplished by a software module is explained. In this case, it is of course that such function can be accomplished by a hardware module. Also, in the above embodiment, the case where the program of causing the control portion 310 to execute the traffic control constituting the characteristic feature of the communication system according to the present invention is stored in advance in the memory portion 340 is explained. In this case, such program may be loaded on a computer-readable recording medium such as CD-ROM (Compact Disk-Read Only Memory), or the like and then may be distributed. Also, such program may be distributed via the telecommunication network such as the Internet, or the like. With this arrangement, the same function as the communication system according to the present invention can be provided to the general computer unit by installing the program loaded on the recording medium or the program distributed via the telecommunication network into the general computer unit.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-252431 filed on Aug. 31, 2005, the contents of which are incorporated herein for reference.

What is claimed is:

1. A communication apparatus, comprising:
   a plurality of first queues to which priorities or predetermined bandwidths are assigned respectively, the plurality of first queues being in a first layer of hierarchy;
   a plurality of second queues which are connected to one of the plurality of the first queues in a series connection, the plurality of second queues being in a second layer of hierarchy which is different than the first layer of hierarchy, each second queue of the plurality of second queues having a priority assigned thereto, respectively; and
   a controller which:
     writes data blocks into the plurality of second queues and at least one of the plurality of first queues which is not connected to the second queues in accordance with a rule;
     reads the data blocks stored in the plurality of second queues in order of the priorities assigned to the second queues respectively, and writes the data blocks read from the plurality of second queues into the one of the plurality of first queues which is connected to the second queues in the series connection; and
     reads the data blocks stored in the plurality of first queues in order of the priorities assigned to the first queues respectively or at time intervals corresponding to the bandwidths assigned to the first queues respectively, and transmits the data blocks to a communication network.

2. The communication apparatus according to claim 1, wherein the controller sets the rule;
   wherein each of the data blocks includes a header portion which has a communication address indicating a destination or a sender and either an application identifier indicating an application program for receiving the data blocks or an application program for transmitting the data blocks or a priority identifier indicating priorities of the data blocks; and
   wherein the rule defines that the data blocks are respectively written into the plurality of second queues and the at least one of the plurality of first queues on the basis of at least one of the communication address, the application identifier and the priority identifier contained in the header portion of each of the data blocks.

3. The communication apparatus according to claim 1, wherein the controller sets the rule;
   wherein each of the data blocks includes a header portion which has a communication address indicating a destination or a sender and either a port number indication application indicating an application program for receiving the data blocks or an application program for transmitting the data blocks or a precedence value in a TOS field of the header portion indicating priorities of the data blocks; and
   wherein the rule defines that the data blocks are respectively written into the plurality of second queues and the at least one of the plurality of first queues on the basis of at least one of the communication address, the port number indication application and the precedence value in the TOS field contained in the header portion of each of the data blocks.

* * * * *